United States Patent

Rothballer et al.

[11] Patent Number: 5,951,214
[45] Date of Patent: Sep. 14, 1999

[54] INDEXABLE INSERT AND ASSOCIATED TOOL

[75] Inventors: Gerhard Rothballer, Lehrberg; Erwin Stallwitz, Lichtenau; Helmut Storch, Rothenburg, all of Germany

[73] Assignee: Widia GmbH, Essen, Germany

[21] Appl. No.: 08/687,459

[22] PCT Filed: Jan. 24, 1995

[86] PCT No.: PCT/DE95/00083

§ 371 Date: Jul. 29, 1996

§ 102(e) Date: Jul. 29, 1996

[87] PCT Pub. No.: WO95/20452

PCT Pub. Date: Aug. 3, 1995

[30] Foreign Application Priority Data

Jan. 31, 1994 [DE] Germany ............................. 44 02 623
Jun. 1, 1994 [DE] Germany ............................. 44 19 094

[51] Int. Cl.[6] ................................................. B23C 5/22
[52] U.S. Cl. ............................. 407/42; 407/113; 407/114
[58] Field of Search .............................. 407/42, 113, 114, 407/116

[56] References Cited

U.S. PATENT DOCUMENTS

| 3,229,349 | 1/1966 | Leksell . | |
|---|---|---|---|
| 4,318,645 | 3/1982 | McCreery | 407/116 |
| 4,616,962 | 10/1986 | Ushijima | 407/113 |
| 4,632,607 | 12/1986 | Pantzar | 407/113 |
| 4,681,488 | 7/1987 | Markusson | 407/113 |
| 5,007,775 | 4/1991 | Pantzar | 407/113 |
| 5,366,325 | 11/1994 | Stashko . | |
| 5,383,750 | 1/1995 | Satran | 407/113 |
| 5,466,097 | 11/1995 | Wallstrom | 407/113 |
| 5,597,271 | 1/1997 | Men | 407/113 |
| 5,720,583 | 2/1998 | Bohnet | 407/113 |

FOREIGN PATENT DOCUMENTS

| 0 160 278 A2 | 11/1985 | European Pat. Off. . |
| 0 372 717 A3 | 6/1990 | European Pat. Off. . |
| 0 464 825 A2 | 1/1992 | European Pat. Off. . |
| 0 502 541 A1 | 9/1992 | European Pat. Off. . |
| 0 517 019 A1 | 12/1992 | European Pat. Off. . |
| 0 548 752 A1 | 6/1993 | European Pat. Off. . |
| 75 16105 | 12/1975 | France . |
| 1 552 544 | 1/1970 | Germany . |
| 2 307 229 | 8/1973 | Germany . |
| 41 18 068 A1 | 12/1992 | Germany . |
| 43 15 251 A1 | 11/1993 | Germany . |
| 44 19 094 A1 | 8/1995 | Germany . |

*Primary Examiner*—Daniel W. Howell
*Assistant Examiner*—Mark Williams
*Attorney, Agent, or Firm*—Herbert Dubno

[57] ABSTRACT

A throwaway carbide indexable insert and associated tool are disclosed with a flat body (2) that has as base a flat supporting surface (3), as well as at least two cutting edges (4, 5) at the side (6) opposite to the supporting surface (3). The essential characteristic of the invention is that the body (2) is square-shaped and that at least one major cutting portion (4a) and at least one minor cutting portion (5a) are provided. The cutting edges (4, 5) of the major cutting portion (4a) and of the minor cutting portion (5a) are inclined in opposite directions in relation to the supporting surface (3). The flank (8) of the major cutting edge (4a) is perpendicular to the supporting surface (3) and the flank (9) of the minor cutting edge (5a) falls back therefrom inclined at an angle with the supporting surface (3).

10 Claims, 8 Drawing Sheets

INDEXABLE INSERT AND ASSOCIATED TOOL

CROSS REFERENCE TO RELATED APPLICATIONS

This application is a national stage of PCT/DE 95/00083 filed Jan. 24, 1995 and based upon German National applications P 44 02 623.4 of Jan. 31, 1994 and P 44 19 094.8 of Jun. 1, 1994.

FIELD OF THE INVENTION

The invention relates to an indexable insert and to a tool for using this indexable insert, particularly in the form of a milling tool.

BACKGROUND OF THE INVENTION

Indexable inserts having plate-like bodies with planar support surface as a base surface, as well as major cutting areas and minor cutting areas on its side opposite to the support surface, whereby further the flanks of the minor cutting areas receding therefrom are inclined with respect to the support surface, are known from EP 0 502 541 A1. Basically they serve their purpose in a satisfactory manner and as a rule have a sufficient machining efficiency. However it is desirable to further improve the life of the cutting insert, the quality of the machined surfaces produced by the insert as well as the machining efficiency.

Furthermore from EP 0 548 752 A1 an indexable insert is known having a plate body in the shape of a truncated pyramid, which has four major cutting areas distributed over its periphery and in the corner areas four minor cutting areas. The major cutting areas are inclined with respect to the support surface and the minor cutting areas are located in a plane which is parallel to the support surface. Given its cutting geometry, the production of this indexable insert is complicated and extremely expensive in view of the necessary flanks and the plate body shaped like a truncated pyramid.

OBJECTS OF THE INVENTION

It is therefore an object of the present invention to create an indexable insert which meets the highest demands regarding the tool life and surface quality, as well as machining efficiency.

Further it is an object to provide an indexable insert which is at the same time easy to manufacture and without problems.

SUMMARY OF THE INVENTION

In order to achieve these objects, the invention provides the characteristic features defined in claim 1, which are the cuboid shape of the plate body, four major cutting areas and four minor cutting areas at the four corners, respectively four corner areas of the plate body, wherein the major cutting areas and the minor cutting areas are inclined with respect to the support surface in opposite directions. The flanks of the major cutting areas are arranged at a right angle with respect to the support surface.

With the mentioned features an indexable insert is meets the high requirements of many use applications. At the same time it is possible to produce such an indexable insert in a particularly suitable, and therefore cost-effective, manner.

An extremely advantageous cutting geometry results due to the fact that the major cutting areas and the minor cutting areas are respectively inclined towards each other in opposite directions, as well as towards the support surface. Thereby each tine a minor cutting area is located between two major cutting areas and so on, whereby the cutting edges of neighboring major cutting areas, or respectively of minor cutting areas are arranged so that they ascend or descend in the same direction. Thereby each of the minor cutting areas has an inclined transition from the level of the one neighboring major cutting area to the level of the other neighboring major cutting area.

The cutting edges serving as major cutting areas can be straight or slightly curved, and the same applies also to the minor cutting areas.

The preferred tool for the use of the indexable insert is a milling tool. Here it is particularly advantageous when, at a positive axial angle $\lambda_s$ of the major cutting area and a positive angle $\gamma_n$ of the chip-removal face, the seating of the indexable insert stands at a negative radial angle $\sigma$ with respect to a radial surface.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
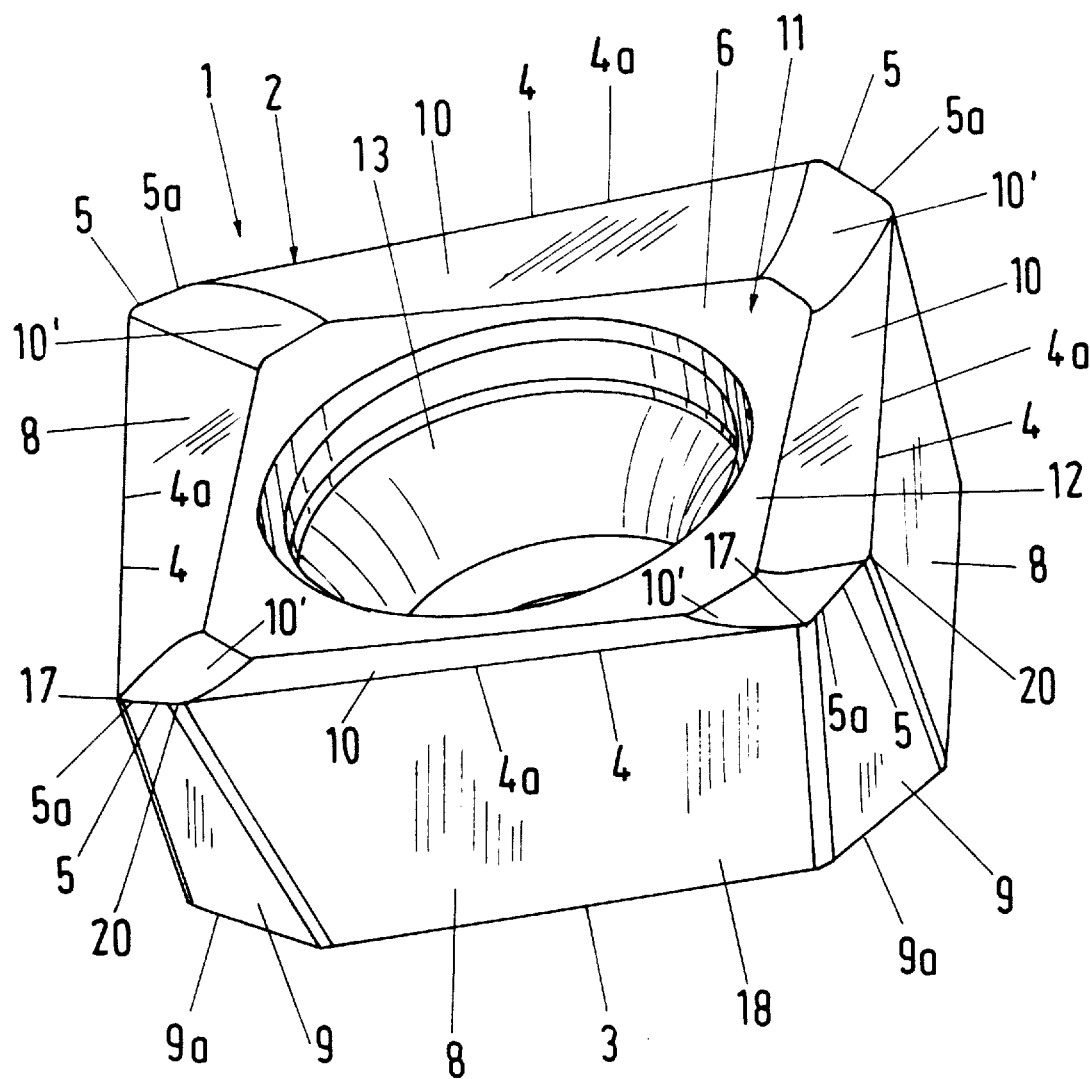
FIG. 1 is a perspective view of the indexable insert on a large scale.

An indexable insert according to FIG. 1 comprises a generally cubical 2 with a plane support surface 3 serving as a base surface and with cutting edges 4 and 5 on its side 6 opposite to the support surface 3. According to the embodiment example shown in FIG. 1, the indexable insert has four cutting edges 4 usable as major cutting areas 4a and corresponding four cutting edges 5 usable as minor cutting areas 5a alternating with the major cutting areas. Further the cutting edges 4, respectively 5, serving as major cutting areas 4a and as minor cutting areas 5a, are inclined with respect to the support surface 3.

The major cutting areas 4a, adjacent in peripheral direction, and also the minor cutting areas 5a, adjacent in peripheral direction, are arranged to ascend or descend in the same sense, whereby the minor cutting areas 5a are located between the cutting edges 4 servings as major cutting areas 4a. Further each of the minor cutting areas 5a runs against the ascendance of the major cutting area 4a, at an inclination from the level H1 (FIG. 2) of the one main cutting area 4a to the level H2 of the adjacent major cutting area 4a. The level H1 is lower than the level H2, so that the major cutting areas 4a, according to the illustration in FIG. 2, ascend from the lower level H1 shown to the right in FIG. 2 to the higher level H2 shown to the left in FIG. 2, whereafter the next minor cutting area 5a descends from the level H2 to the level H1 of the next major cutting area. The angle $\gamma$, which represents the inclination of the minor cutting area 5a in FIG. 2 with respect to the horizontal, equals approximately 25°.

Figure 3:
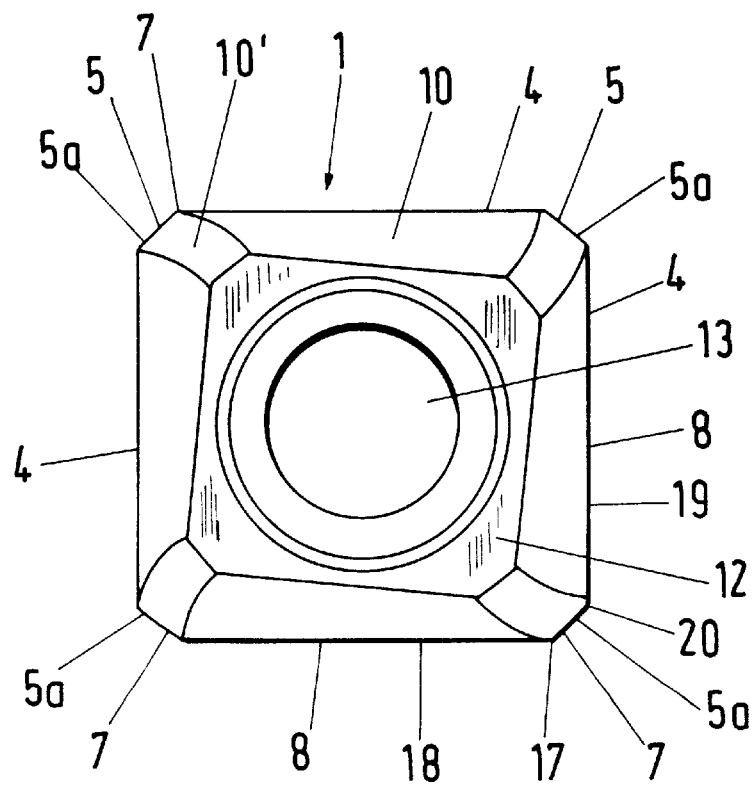
FIG. 3 is a top view of the indexable insert according to FIG. 2.
Figure 4:
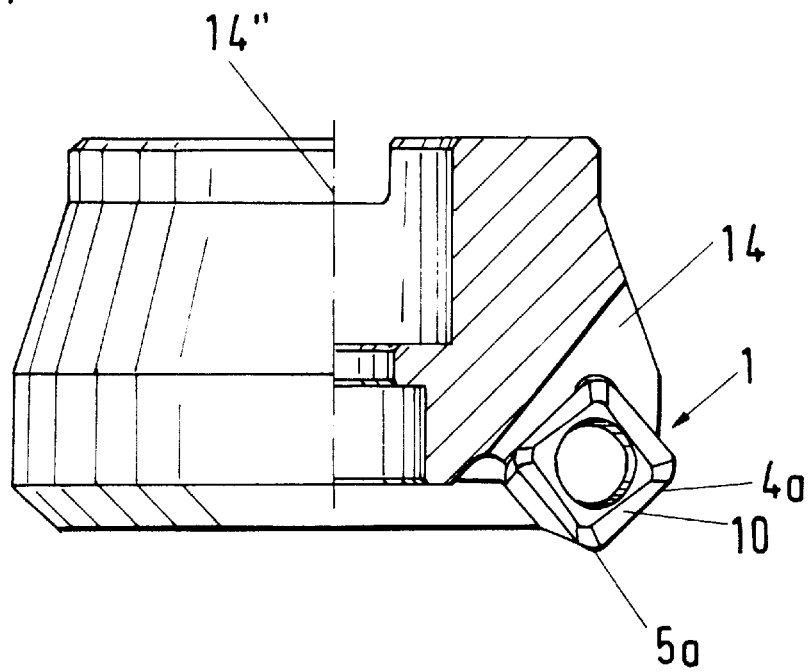
FIG. 4 is a schematic and partially sectioned view of a milling tool with an illustration of the indexable insert in its fitted position.
Figure 5:
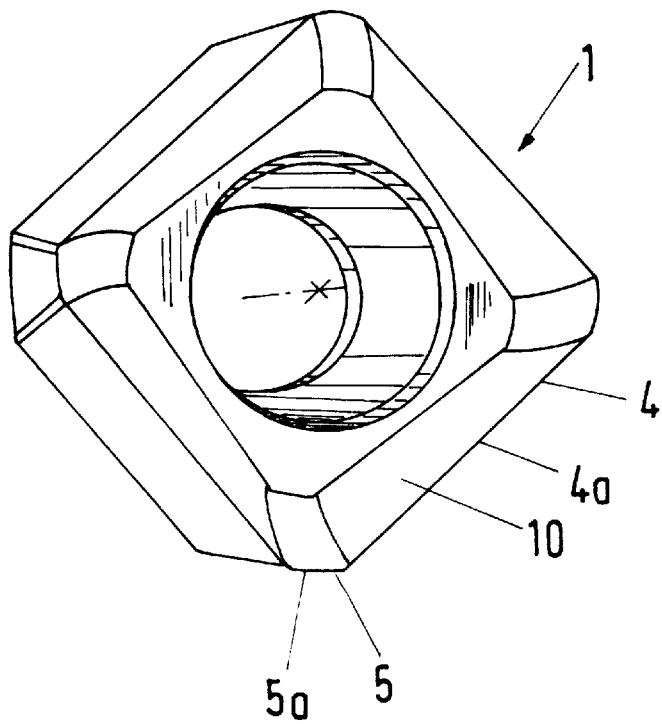
FIG. 5 is a perspective view of the indexable insert in its fitted position according to FIG. 4, on a larger scale.

The minor cutting areas 5a are arranged in the area of the four corners 7 (FIG. 3) of the indexable insert 1. The lengths of their cutting edges 5 are very short compared to the lengths of the cutting edges 4 of the major cutting areas 4a and can for instance be of the order of 1.5 mm.

The major cutting areas 4a are rectilinear cutting edges 4. The minor cutting areas 5a are also preferably rectilinear. However in principle the major cutting areas 4a and the minor cutting areas 5a can also be slightly curved and can then descend along a curve from level H2 to level H1.

The basic shape of the plate body 2 is cubical. The flanks 8 of the major cutting areas 4a are each perpendicular to the support surface 3. The flanks 9 pertaining to the minor cutting areas 5a are inclined with respect to the support surface 3, so that their respective base edges 9a are longer than the cutting areas 5a. Further preferably chamfers are provided in the transition area of the two flanks 8 and 9, as also shown in FIG. 1.

Based on the major cutting area 4a ascending in FIG. 1 from right to left and the minor cutting area 5a adjacent to the right and also ascending and on the minor descending cutting area 5a adjacent to the major cutting area 4a on the left (in FIG. 1), the faces 10 of the major cutting areas 4a and the faces 10' of the minor cutting areas are not symmetrical. Further the faces 10 and 10' descend towards the inside of the indexable insert 1 on the side 6 opposite to the support surface 3, forming a depression 11. This depression 11 forms a holding surface 12 for a fastening means, for instance a screw.

Figure 2:
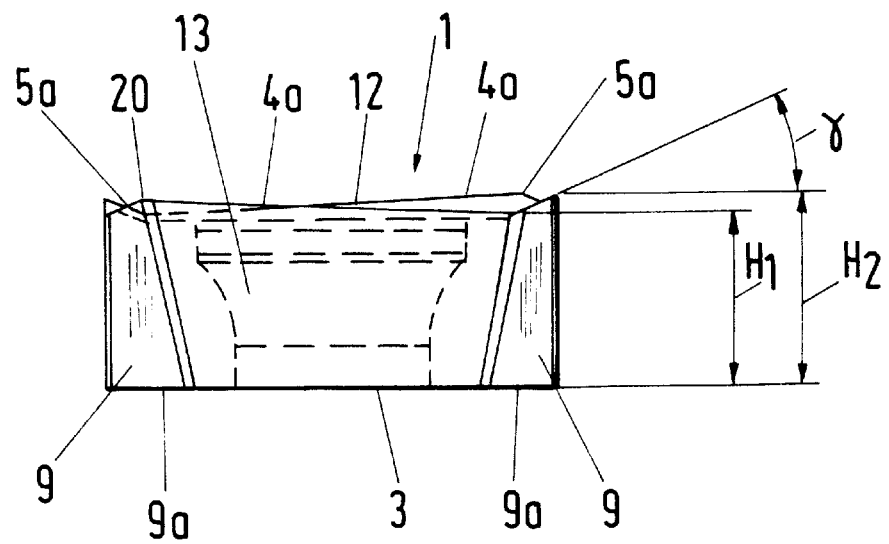
FIG. 2 is a side view of the indexable insert, also to a large but to a different scale from that of FIG. 1.

In this way the holding surface 12 is recessed with respect to all cutting edges 4, 5 and is located parallelly to the support surface 3, as shown in FIG. 2. Further a bore 13 for the fastening means passes through the plate body 2 in the area of the holding surface 12.

Figure 6:
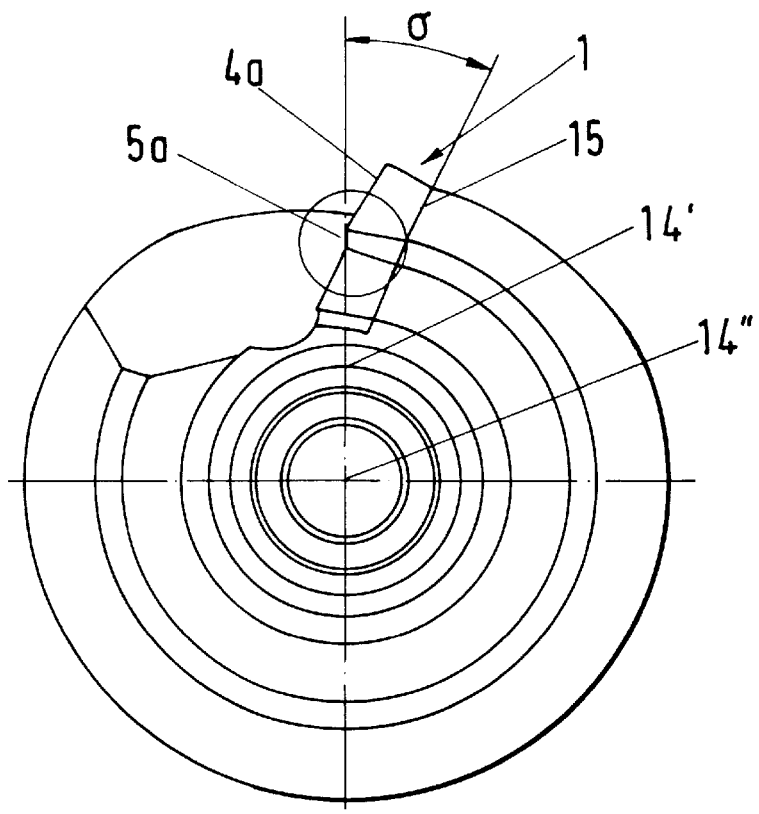
FIG. 6 is a schematic frontal view of a milling tool with the arrangement of the indexable insert at a negative radial angle $\sigma$ for the fitting surface of the indexable insert.
Figure 7:
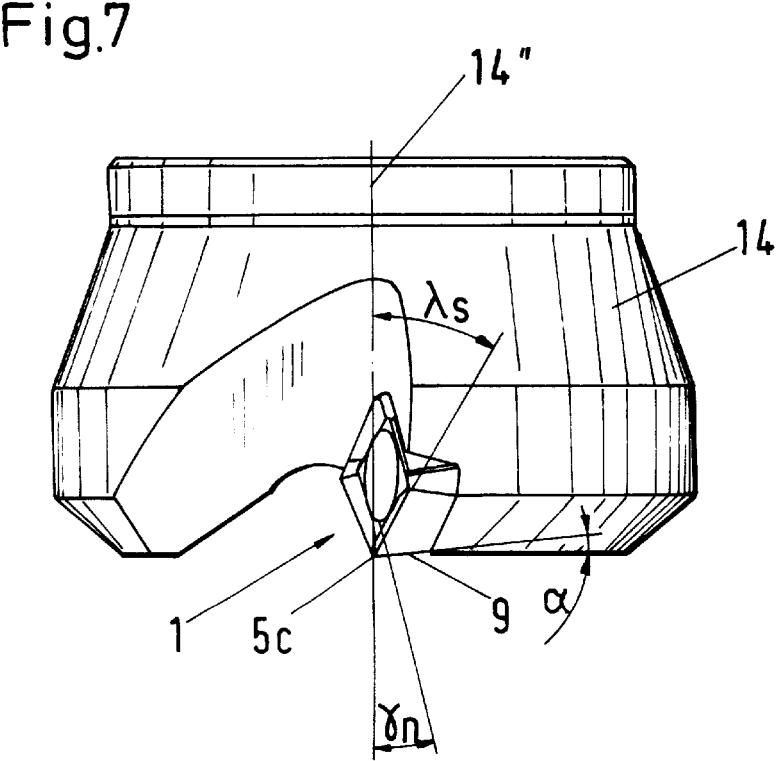
FIG. 7 is a schematic side view of a milling tool with an illustration of the indexable insert and showing essential angles.

The use of the indexable insert 1 takes place suitably in connection with a milling tool 14 (FIGS. 6 and 7). It is advantageous when the radial angle $\sigma$ between the fitting surface 15, upon which the indexable insert 1 rests with its support surface 3, and the radial plane 14' according to FIG. 6 is negative. The minor cutting area 5a lies then also directly or close to the mentioned radial plane (FIG. 6).

Further from FIG. 7 it can be seen that the angles of the indexable insert 1 are so selected, and the indexable insert 1 is so fitted, that the axial angle $\lambda_s$ of the major cutting area is positive and that also the angle $\gamma_n$ measured in radial direction (radial angle) between the face 10 and the axis of rotation 14" is positive.

The clearance angle $\alpha$ (FIG. 7) for the flank 9 of the minor cutting area 5a equals for instance 5–6°, advantageously 5°, and for the other involved angles the following values apply: negative radial angle $\sigma=-15°$ to $-30°$, particularly $-25°$ positive axial angle $\lambda_s=+10°$ to $+25°$, particularly $+21°$, radial angle $\gamma_n=+5°$ to $+15°$, particularly $+12°$.

Based on the described fitting of the indexable insert 1 it is possible to use a cuboid plate body 2, whereby further the flanks 8 of the major cutting area 4a are perpendicular to the support surface 3. Only the small flanks 9 of the minor cutting areas 5a have to be set back. The basic cuboid shape of the indexable insert 1 offers the advantage of a particularly simple processing, even for manufacturing of the plate seat in the basic milling body. Due to the slightly set back flanks 9 of the minor cutting areas, the cuboid plate body 2 has a negative basic shape. Further due to the radially negative embedding of the plate body 2 in the basic body of the tool 14 a negative radial clearance angle is created.

The recessed holding surface 12 is formed by the faces 10, respectively 10', which are at an angle to the flanks 8, 9, which is smaller than 90°. The thereby created wedge angle approximately 65° and the cutting angle $\gamma$ is approximately 25° (FIG. 2).

The minor cutting areas 5a stand at an angle with respect to the support surface 3 which is larger than 90°. This results in the production of a helical chip, which already due to its configuration exits the chip space, thereby insuring a frictionless chip discharge.

Figure 8:
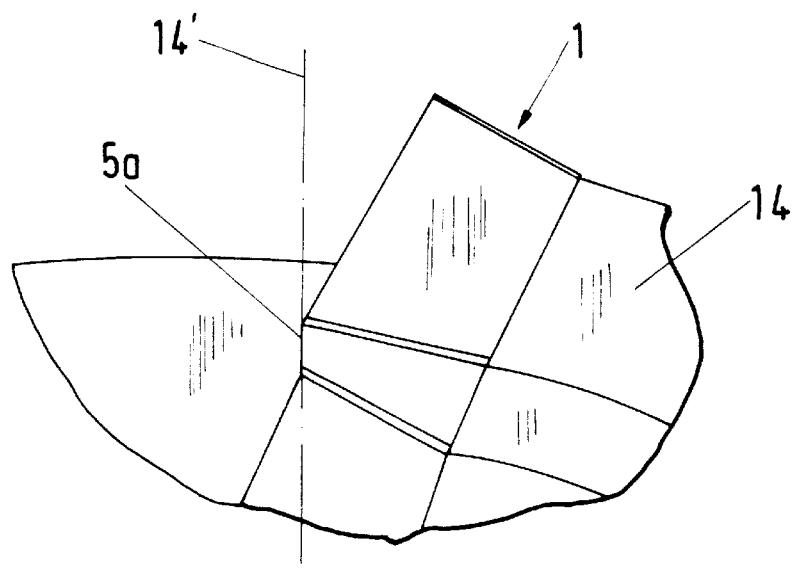
FIG. 8 is a detail of FIG. 6 to a larger scale.

The descending minor cutting area 5a is important with regard to the occurring shear force. As is shown primarily in FIG. 6 and on a larger scale in FIG. 8, the minor cutting area 5a runs almost parallel to the radial plane 14', or a radial median of the milling tool 14 rotating about the axis of rotation 14" (FIG. 6). According to FIG. 8 the position of the minor cutting area 5a is either parallel to the radial plane 14' or slightly negative. This prevents a pressing or precutting by the minor cutting area 5a.

The minor cutting areas 5a form the corners 7 7 of the indexable insert 1 and together with the respective neighboring major cutting area 4a form a common minimum level 17. The minimum level 17 is located in the area of the flank 8 a plant 18 of the flank, as well as at a slight distance from the level 19 of the flank 8 following in counterclockwise direction as in FIG. 3. The maximal level 20 is in this case at the respective other end of the major cutting area 4a or the minor cutting area 5a.

Figure 9:
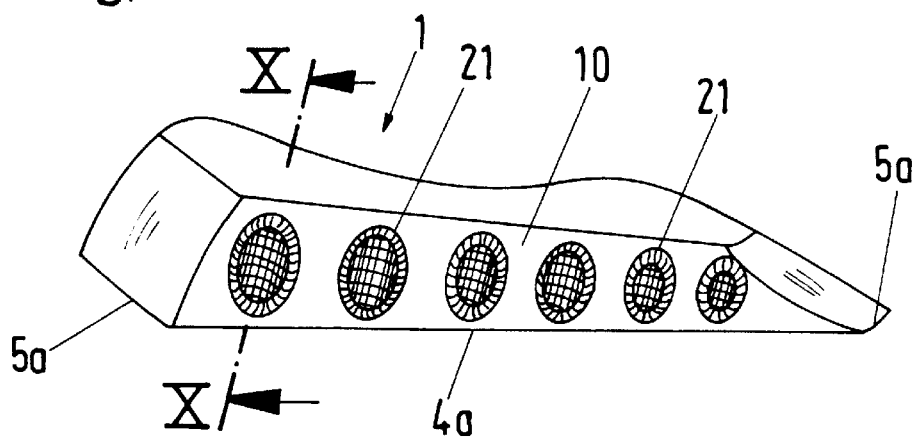
FIG. 9 is a view of a major cutting area with neighboring minor cutting areas, as well as a preferred face with chip-shaping elements, on a further enlarged scale.
Figure 10:
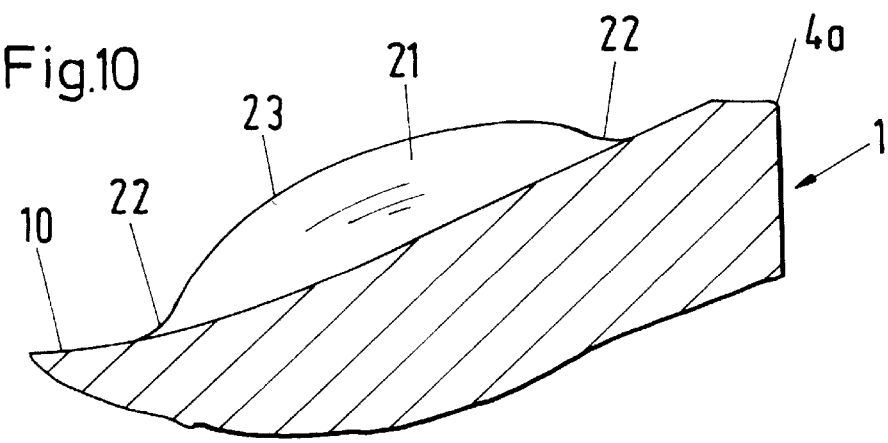
FIG. 10 is a section along the line X—X in FIG. 9, again to an enlarged scale.

Finally the two FIGS. 9 and 10 have a face 10, which is not totally smooth and is slightly curved in itself for the major cutting area 4a, but which is provided with several chip-forming elements 21. The chip-forming elements 21 are somewhat oblong, slightly buckled projections, which rise gradually from the face 10 and which on the opposite side descend also gradually back to the face 10. In section the contour of the chip-forming elements 21 is concave as well as convex, as can also be seen in the areas 22 and 23 in FIG. 10.

In the embodiment shown, on the face 10 there are six chip-forming elements 21. The buckled chip-forming elements 21 are elongated transversely to the major cutting area 4a in the chip-removal direction.

Compared to FIG. 9, FIG. 10 shows especially that the buckled chip-forming elements 21 rise directly from the face 10 descending from the major cutting area 4a.

Figure 11:
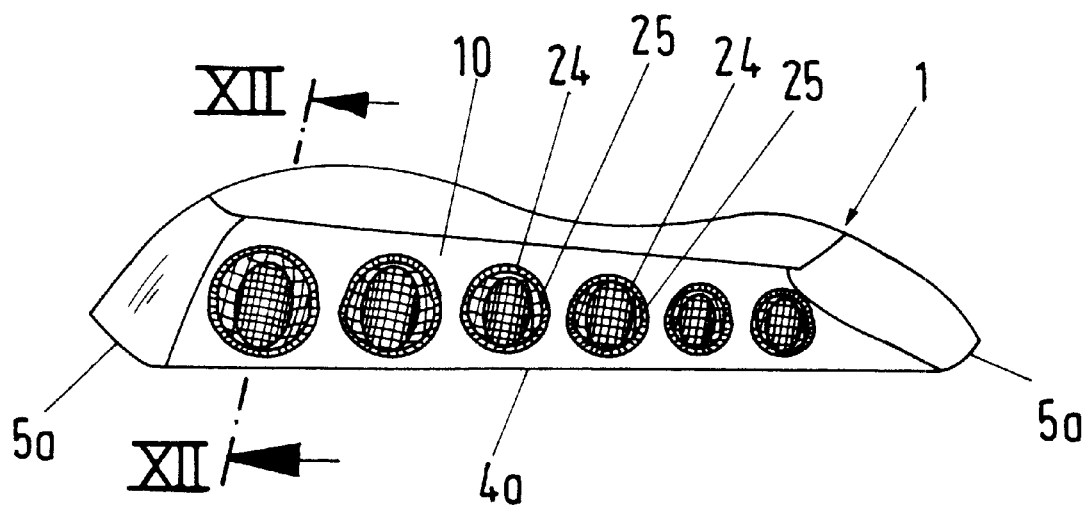
FIG. 11 is a view such as in FIG. 9 of a modified embodiment.
Figure 12:
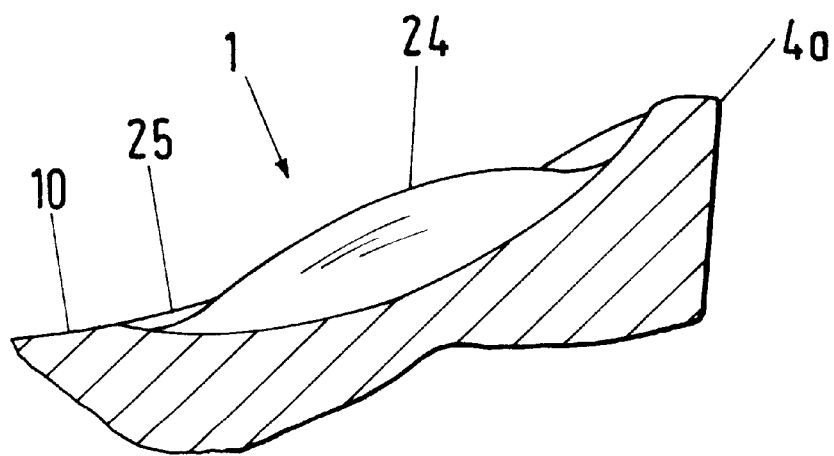
FIG. 12 is a section along line XII—XII in FIG. 11 on a further enlarged scale.

The two FIGS. 11 and 12 refer also to the buckled chip-forming elements 24 on the face 10 of the major cutting area 4a. However the buckled chip-forming elements 24 do not rise directly from the face 10, but from an annular depression 25. At the bottom side each chip-forming element 24 ends in the inner, annular depression 25, as well as below the level of the face 10, as shown in section in FIG. 12.

Therefore the faces 10 can either be smooth, or they can have chip-forming elements. Furthermore also other modified versions or completions are possible, without departing from the basic concept of the invention.

Figure 13:
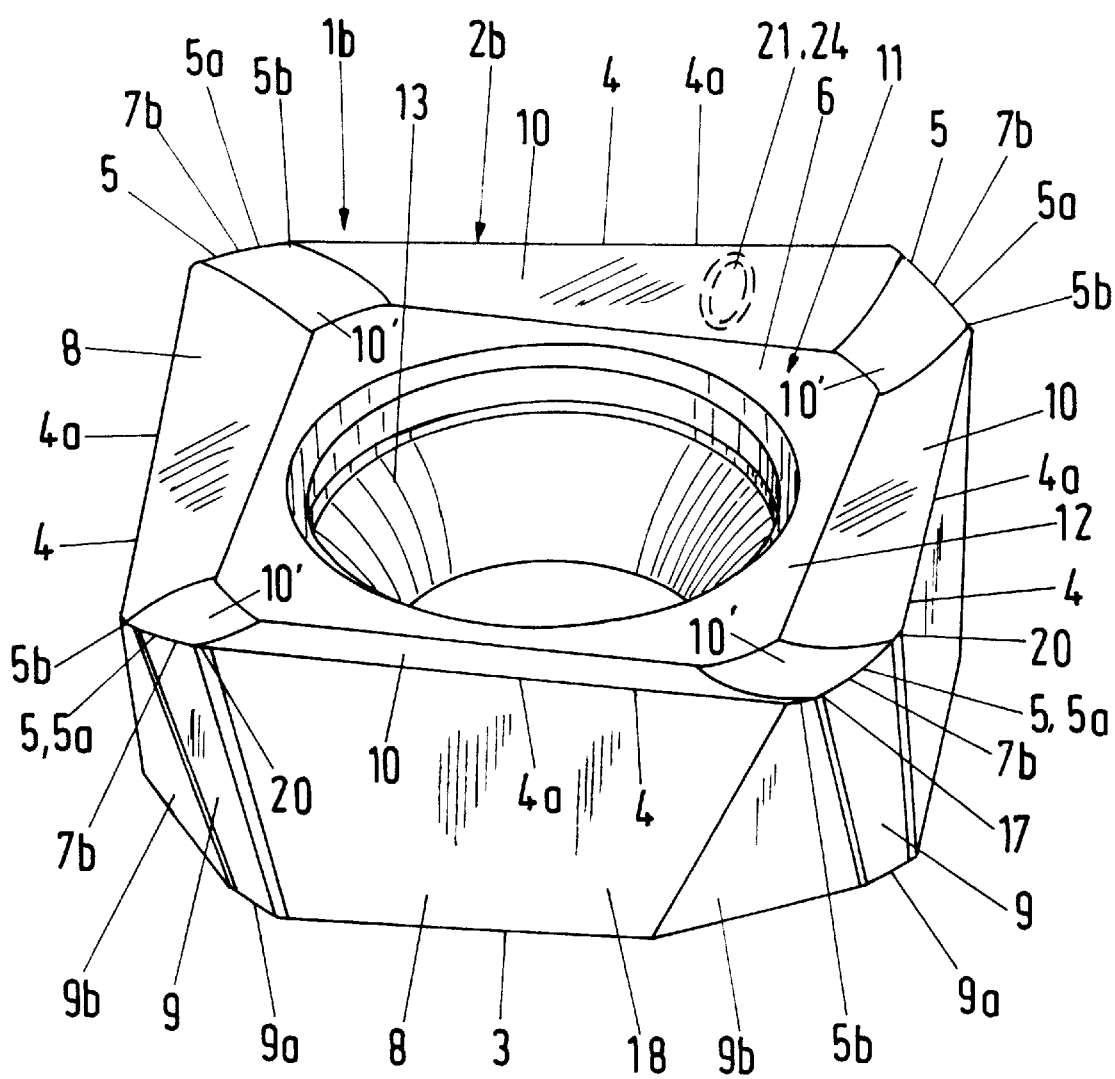
FIG. 13 is a perspective view such as in FIG. 1 of a further modified embodiment example, with respectively second or secondary minor cutting areas

Finally in FIG. 13 a last embodiment of an indexable insert 1b is shown in a perspective view corresponding to the indexable insert 1 shown in FIG. 1 and it comprises in addition thereto second or secondary minor cutting areas 5b, with the respective pertaining flanks 9b. Identical, respectively corresponding features of the indexable insert 1b have the same reference numerals as the indexable insert in FIG. 1. Only the additional features are marked by the additional letter b.

Corresponding to the indexable insert 1 in FIG. 1, in the indexable insert 1b four major cutting areas 4a are located on one side 6 of the plate body 2 and each ascends in the same direction (e.g. clockwise) to the minor cutting areas 5b, which are arranged at the corners 7b, of the plate body 2b. Each minor cutting area 5a falls again back to the level of the next major cutting area 4a, whereby between the lower level of the minor cutting area 5a and the lower level of the major cutting area 4a an additional secondary minor cutting area 5b is located, as shown in the developed view of FIG. 14. The secondary minor cutting area 5b runs basically parallel to the support surface 3 of the plate body 2b of the indexable insert 1b. The major cutting area 4a, the secondary minor cutting area 5b and the minor cutting area 5a are therefore arranged at an angle with respect to each other, whereby further the major cutting areas 4a and the minor cutting areas 5a each descend towards the secondary minor cutting areas 5b.

The secondary minor cutting area is relatively short. The thereto pertaining flank 9b is trapezoidal.

Figure 14:
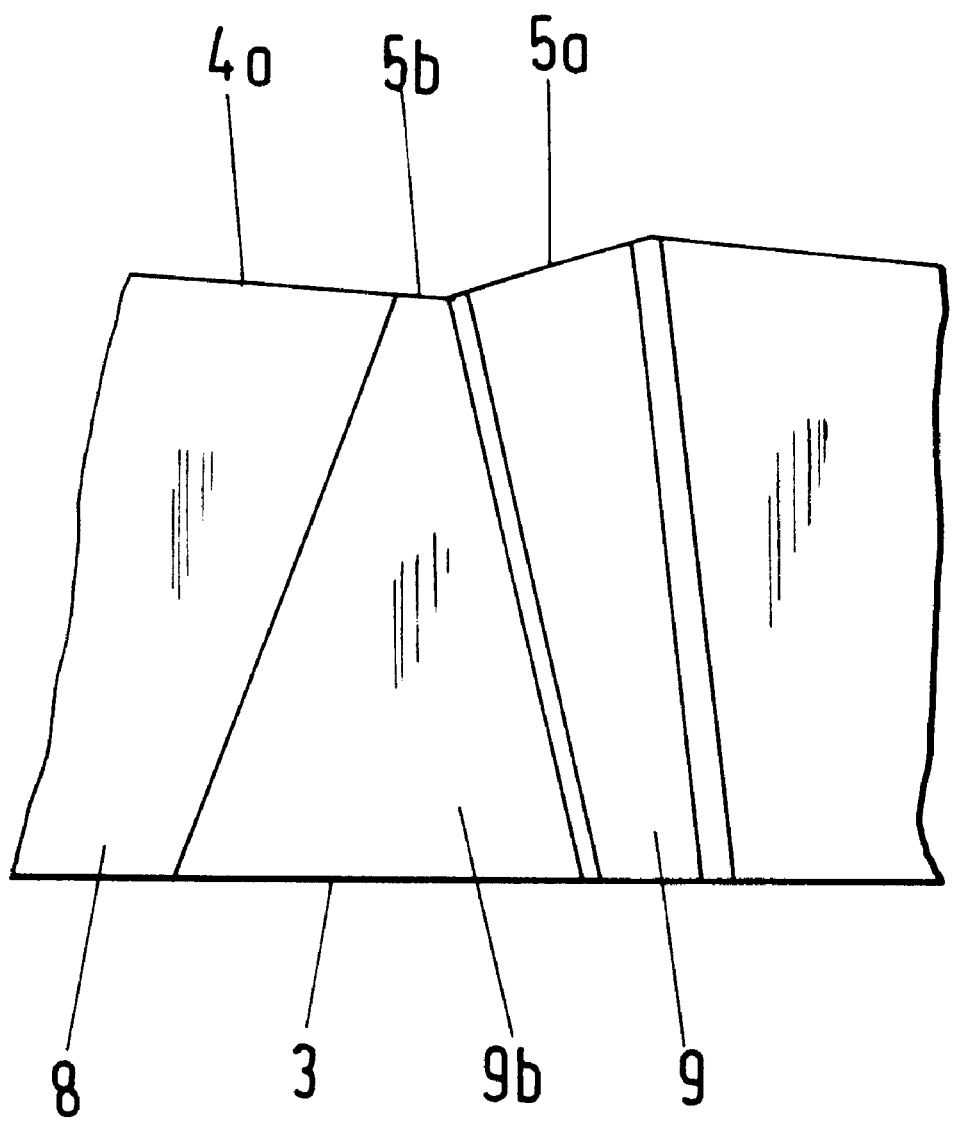
FIG. 14 is a developed view of the major and minor cutting areas.

Finally the major cutting area 4a, the secondary minor cutting area 5b and the minor cutting area 5a are at an angle towards each other not only in the developed view of FIG. 14, and therefore in lateral projection, but also in a top view on the indexable insert 1b they are arranged at an angle to each other. Thereby the minor cutting area 5a is at an angle of approximately 45° to the major cutting area 4a and the secondary minor cutting area 5b is at an angle of e.g. 30° to the adjacent major cutting area 4a.

In the transition area between the flanks 8, 9, respectively 9a and 9b chamfers can still be provided, as shown in FIG. 13. Also between the flanks 8 and 9 of FIG. 1 preferably chamfers are arranged. Instead of chamfers, in all cases it is also possible to provide rounds in a basically known fashion.

Finally it is also possible to have chip-forming elements 21 on the various faces 10 of the indexable insert 1b according to FIG. 13, as schematically shown in FIG. 13 in broken lines in the form of a single chip-forming element 21. Chip-forming elements 21 or 24, according to the various embodiment examples in FIGS. 9 to 12, can thus also be provided in the indexable insert 1b.

Therefore the invention is not limited to the embodiment examples concretely shown in the figures, moreover modified versions and completions are possible, without departing from the basic concept of the invention.

We claim:

1. An indexable cutting insert for a cutting tool, comprising a plate body having a planar base surface on a supported side of said body and a cutting side opposite said supported side, and a plurality of major cutting areas on said cutting side alternating with primary minor cutting areas on said cutting side and extending around a periphery of said body with said primary minor cutting areas angularly adjoining said major cutting areas and forming corner regions of said body, each of said major cutting areas having a major cutting edge being inclined upwardly with respect to said planar base surface from a lower point at one corner region to a higher point at another corner region, an adjacent primary minor cutting edge being inclined downwardly with respect to said planar base surface from a respective one of said higher points to a lower point, each of said primary minor cutting edges being shorter than said major cutting edges, respective secondary minor cutting areas generally parallel to said planar base surface and located between each primary minor cutting area and a next major cutting area and having a respective secondary minor cutting edge between the lower point of an adjacent primary minor cutting edge and the lower point of an adjacent major cutting edge, said body being further formed with major flanks substantially perpendicular to said planar base surface running between each major cutting edge and said planar base surface, primary minor flanks inclined inwardly from said primary minor cutting edges to said planar base surface, and secondary minor flanks running from said secondary minor cutting edges to said planar base surface.

2. The indexable cutting insert defined in claim 1 wherein each of said major flanks forms an angle of less than 90° with the respective cutting area at the respective cutting edge.

3. The indexable cutting insert defined in claim 2 wherein said plate body has four major cutting areas, four primary minor cutting edges and four secondary minor cutting edges.

4. The indexable cutting insert defined in claim 3 wherein each of said major cutting areas has a face delimited by the respective major cutting edge and provided with at least one chip forming element.

5. The indexable cutting insert defined in claim 4 wherein each of said faces is provided with a plurality of said chip forming elements.

6. The indexable cutting insert defined in claim 5 wherein each of said chip forming elements includes a bulge.

7. The indexable cutting insert defined in claim 6 wherein each of said bulges is surrounded by a recess.

8. The indexable cutting insert defined in claim 3 wherein said plate body is formed with a bore for affixing said cutting insert to a cutting tool at a center of said plate body.

9. The indexable cutting insert defined in claim 8 wherein said center of said plate body is formed with a recess on said cutting side.

10. The indexable cutting insert defined in claim 3 wherein said tool is a milling tool.

* * * * *